Sept. 26, 1961 H. F. VIVIAN ET AL 3,001,883
CELLULOSE ACETATE BUTYRATE GASKET
Filed Dec. 11, 1958

HAROLD F. VIVIAN
MARTIN SALO
INVENTORS

BY R. Frank Smith
Henry E. Byers
ATTORNEYS

3,001,883
CELLULOSE ACETATE BUTYRATE GASKET

Harold F. Vivian and Martin Salo, Rochester, N.Y., assignors to Eastman Kodak Company, Rochester, N.Y., a corporation of New Jersey
Filed Dec. 11, 1958, Ser. No. 779,729
4 Claims. (Cl. 106—162)

This invention concerns container closures and more particularly improved caps of the screw and crown types.

Container closures are commonly made by combining a shell with a liner of cork or the like so that when the cap is placed on the container, pressure is used to compress the liner and obtain a relatively tight seal. Variations in liner material have been used depending upon the type of material for which the container is intended, the possible reuse of the caps and the like. In instances where a simple closure is required cork or waxed paper may be very satisfactory. In other situations a polymeric material such as polyethylene has been used which provides a resilient cushion which may protect the metal of the cap from corrosion.

The use of the above materials is highly selective depending upon the container and the contents. However, it has been desired to have a material which would be inexpensive, easily applied to the closure and which would permit reuse.

We have discovered a gasket sealing material which can be coated on caps of the screw and crown types which provides a satisfactory seal for a large number of applications, can be applied easily using a hot melt method of application and which can be renewed after use by merely heating the caps to the melting temperature of the coating composition. The material is an improvement over wax which is relatively soft and may have blocking tendencies or polyethylene which requires a relatively high temperature in order to melt the polyethylene having suitable characteristics for primary application or for reuse.

One object of this invention is to provide a container closure, the cushion liner of which comprises an inexpensive, easily applied, reusable material. A further object is to provide a container closure having a sealant which can provide a satisfactory seal and can be removed with the exertion of a relatively low torque when used with a screw type cap. A further object is to provide a sealing liner particularly adapted for closures for containers containing photographic materials.

The above objects are accomplished by preparing a container closure by combining a metal or plastic shell with a cushion liner comprising a hot melt application of cellulose acetate butyrate mixed with sucrose acetate isobutyrate. The mixture may also be further modified by the addition of a small amount of paraffin or other wax, plasticizer or the like. Our preferred embodiment comprises 20–35% by weight cellulose acetate butyrate having above 30% butyryl content and 50–75% sucrose acetate isobutyrate having from 1–6 acetyl groups (R′) and from 2 to 7 isobutyryl groups (R) per sucrose unit as shown in the following molecular representation of sucrose acetate isobutyrate.

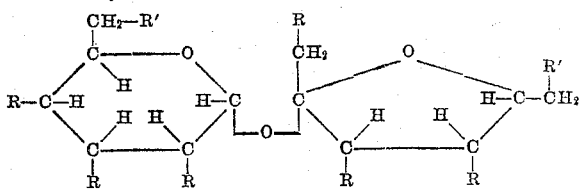

From 0–10% of a plasticizer may be used. A typical plasticizer is a polymeric plasticizer prepared by reacting neopentyl glycol with adipic acid and then reacting this product with 2-ethylhexanol. Other plasticizers such as a polyester of propylene glycol and adipic acid, poly-α-methyl styrene, and the like may also be used.

Wax materials may be added in an amount from 0–5% by weight such as paraffin, carnauba wax, zinc stearate, micro-crystalline wax or the like. In our preferred embodiment the melt viscosity is below 15,000 cps. at 170° C. and above 1,000 cps.

In the accompanying drawings, FIGURES 1–4 are sectional views of the various forms of container closures and elements thereof embodying our invention.

In FIGURE 1 a beverage crown cap 1 has a sealing element 2 which is a gasket seal of cellulose acetate butyrate modified with sucrose acetate isobutyrate.

Figure 1:
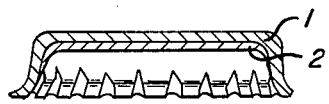
Figure 2:
FIGURE 2 shows a screw cap closure consisting of a molded plastic shell 3 and a disc 4 of cellulose acetate butyrate modified with sucrose acetate isobutyrate.
Figure 3:
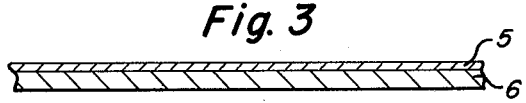
FIGURE 3 shows sheet material, which consists of a metal sheet 6 having an adherent coating 5 of cellulose acetate butyrate modified with a sucrose acetate isobutyrate which is adapted for having crown type closure stamped or a disc for use in a screw type closure.
Figure 4:
FIGURE 4 shows a fibrous material 7 such as cloth, paper, glass, wool or the like impregnated with cellulose acetate butyrate modified with sucrose acetate isobutyrate for use as a gasket.

The following examples are intended for illustration only and are not intended to limit our invention.

Example 1

A gasket seal composition having the following composition was prepared and coated in the molten state in the inner side of a screw type closure:

25 parts by weight cellulose acetate butyrate
70 parts by weight sucrose acetate isobutyrate
5 parts by weight of a polymeric plasticizer obtained by reacting the reaction product of neopentyl glycol and adipic acid with 2-ethylhexanol.

The screw type closure was found to provide an effective seal at low assembly torque of 10 inch pounds and less and after storage to be removable in the same torque range.

Example 2

A composition having the same proportions as in Example 1 plus 5 parts by weight of paraffin was found to provide a satisfactory sealant.

Example 3

A gasket sealant compound having the same proportions as Example 1 plus 1 part by weight of paraffin wax had a melt viscosity of 1520 cps. at 160° C.

For a satisfactory sealant, it is necessary that a material have good blocking characteristics and that the accompanying qualities of the materials be such that the cover can be removed by hand after being attached to the container for a relatively long period of time. This is particularly true of articles which may be carried on shelves which are sold commercially.

In certain embodiments of our invention, the sealant may be combined with softening materials such as fibers of various types, fillers and the like. Typical fillers include chalk, titanium dioxide, cellulose fibers and the like.

Although our sealant is intended primarily for screw or crown type closure, it will be understood that it can be used on other types wherein a seal is desired. Also the sealant may be used on various plastic materials including polyethylene, hard rubber, phenol formaldehyde, urea formaldehyde and the like.

We claim:
1. A container closure comprising a shell having a cushion liner consisting essentially of 20–35% by weight cellulose acetate butyrate and 50–75% by weight sucrose acetate isobutyrate having 1–6 acetyl groups and 2–7 isobutyryl groups per sucrose unit.

2. A sheet material adapted to be formed into container closures containing an adherent coating consisting essentially of 20–35% by weight cellulose acetate butyrate, and 50–75% by weight sucrose acetate isobutyrate having 1–6 acetyl groups and 2–7 isobutyryl groups per sucrose unit.

3. A sealant composition consisting essentially of 20–35% by weight cellulose acetate butyrate, 50–75% by weight sucrose acetate isobutyrate having 1–6 acetyl groups and 2–7 isobutyryl groups per sucrose unit, 1–10% by weight plasticizer, and 1–5% by weight wax.

4. A sealant composition consisting essentially of 20–35% by weight cellulose acetate butyrate, 50–75% by weight sucrose acetate isobutyrate having 1–6 acetyl groups and 2–7 isobutyryl groups per sucrose unit, and 1–5% by weight wax.

References Cited in the file of this patent

UNITED STATES PATENTS

| | | |
|---|---|---|
| 2,092,677 | Lovett | Sept. 7, 1937 |
| 2,931,802 | Touey et al. | Apr. 5, 1960 |